(12) United States Patent
Nagai

(10) Patent No.: US 12,146,117 B2
(45) Date of Patent: Nov. 19, 2024

(54) REFRIGERATOR OIL, AND WORKING FLUID COMPOSITION FOR REFRIGERATOR

(71) Applicant: ENEOS Corporation, Tokyo (JP)

(72) Inventor: Satoshi Nagai, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 189 days.

(21) Appl. No.: 17/629,533

(22) PCT Filed: Jul. 17, 2020

(86) PCT No.: PCT/JP2020/027881
§ 371 (c)(1),
(2) Date: Jan. 24, 2022

(87) PCT Pub. No.: WO2021/020182
PCT Pub. Date: Feb. 4, 2021

(65) Prior Publication Data
US 2022/0251467 A1 Aug. 11, 2022

(30) Foreign Application Priority Data
Jul. 29, 2019 (JP) .................................. 2019-138930

(51) Int. Cl.
*C10M 169/04* (2006.01)
*C09K 5/04* (2006.01)
*C10M 129/10* (2006.01)
*C10M 129/16* (2006.01)
*C10M 129/70* (2006.01)
C10N 30/12 (2006.01)
C10N 40/30 (2006.01)

(52) U.S. Cl.
CPC ........... *C10M 169/04* (2013.01); *C09K 5/044* (2013.01); *C10M 129/10* (2013.01); *C10M 129/16* (2013.01); *C10M 129/70* (2013.01); C09K 2205/122 (2013.01); C09K 2205/128 (2013.01); C09K 2205/22 (2013.01); C10M 2203/003 (2013.01); C10M 2207/023 (2013.01); C10M 2207/046 (2013.01); C10M 2207/281 (2013.01); C10N 2030/12 (2013.01); C10N 2040/30 (2013.01)

(58) Field of Classification Search
CPC .............. C10M 129/16; C10M 169/04; C10M 129/10; C10M 171/008; C10M 129/70; C10M 2207/042; C10M 2215/064; C10M 2207/023; C10M 2203/003; C10M 2207/281; C10M 2207/046; C10M 2207/2835; C09K 5/044; C09K 2205/128; C09K 2205/122; C09K 2205/22; F25B 31/002; F25B 2400/12; C01N 2020/02; C01N 2020/101; C01N 2020/097; C01N 2030/10; C01N 2030/64; C01N 2030/12; C01N 2040/30; C01N 2030/20
See application file for complete search history.

(56) References Cited

U.S. PATENT DOCUMENTS

| 5,595,963 A | 1/1997 | Puckace et al. |
| 2010/0133463 A1 | 6/2010 | Kaneko et al. |
| 2012/0322897 A1 | 12/2012 | Bredsguard et al. |
| 2013/0023454 A1* | 1/2013 | Bredsguard ............ C08K 5/11 508/496 |
| 2017/0002243 A1 | 1/2017 | Porter et al. |
| 2017/0138641 A1* | 5/2017 | Fujitaka ................. F04C 29/02 |

FOREIGN PATENT DOCUMENTS

| CN | 106103641 A | 11/2016 |
| CN | 106433887 A | 2/2017 |
| CN | 108913305 A | 11/2018 |
| EP | 0 913 457 A2 | 5/1999 |
| EP | 3 085 757 A1 | 10/2016 |
| JP | 58-019393 | 2/1983 |
| JP | H06-025683 | 2/1994 |
| JP | H08-134481 | 5/1996 |
| JP | 11-228984 A | 8/1999 |
| JP | 2008-266423 | 11/2008 |
| JP | 2009-074021 A | 4/2009 |
| JP | 2013-133443 A | 7/2013 |
| JP | 2014-517124 A | 7/2014 |
| JP | 2016-023902 A | 2/2016 |
| JP | 2017-502155 | 1/2017 |
| KR | 93-0011932 B1 | 12/1993 |
| KR | 10-0318110 B1 | 7/2002 |
| WO | 94/21759 A1 | 9/1994 |
| WO | 2012/173774 A1 | 12/2012 |
| WO | 2015/105933 | 7/2015 |
| WO | 2017/086221 A1 | 5/2017 |

(Continued)

OTHER PUBLICATIONS

Search Report issued in EP Patent Application No. 20848044.2. Aug. 5, 2022.
ISR issued in International Patent Application No. PCT/JP2020/027881, Sep. 29, 2020, translation.
Written Opinion issued in International Patent Application No. PCT/JP2020/027881, Sep. 29, 2020, translation.
IPRP issued in International Patent Application No. PCT/JP2020/027881, Feb. 10, 2022, translation.
Office Action issued in EP Patent Application No. 20848044.2, Mar. 31, 2023.
Office Action issued in EP Patent Application No. 20848044.2, Nov. 30, 2023.

(Continued)

*Primary Examiner* — Vishal V Vasisth

(74) *Attorney, Agent, or Firm* — GREENBLUM & BERNSTEIN, P.L.C.

(57) ABSTRACT

A refrigerating machine oil according to the present invention contains a lubricating base oil and alkylated hydroxyanisole, and a working fluid composition for a refrigerating machine according to the present invention contains the refrigerating machine oil and a refrigerant.

6 Claims, No Drawings

(56) References Cited

FOREIGN PATENT DOCUMENTS

WO 2019/108720 A1 6/2019

OTHER PUBLICATIONS

Database WPI Week 201726 Thomson Scientific, London, GB; AN 2017-171333 (2017).
Database WPI Week 201726 Thomson Scientific, London, GB; AN 2017-171333 (2017), (translation of previously submitted CN 106433887 A).

* cited by examiner

REFRIGERATOR OIL, AND WORKING FLUID COMPOSITION FOR REFRIGERATOR

This application is a 371 of PCT/JP2020/027881, filed Jul. 17, 2020.

TECHNICAL FIELD

The present invention relates to a refrigerating machine oil and a working fluid composition for a refrigerating machine.

BACKGROUND ART

Refrigerating machines, such as refrigerators, car air conditioners, room air conditioners, vending machines, and the like, include a compressor for circulating a refrigerant through a refrigeration cycle. The compressor is filled with refrigerating machine oil for lubricating the sliding members. A refrigerating machine oil is generally required to have properties such as abrasion resistance and stability, and contains various additives selected according to the required properties. For example, the following Patent Document 1 discloses that an acid scavenger or the like is added in order to improve stability of the refrigerating machine oil.

CITATION LIST

Patent Document

[Patent Document 1] Japanese Unexamined Patent Publication No. 2008-266423

SUMMARY OF INVENTION

Technical Problem

However, the conventional refrigerating machine oil has room for further improvement in terms of stability, such as suppressing the generation of impurities. Accordingly, an object of the present invention is to provide a refrigerating machine oil having excellent stability, and a working fluid composition for a refrigerating machine containing the refrigerating machine oil.

Solution to Problem

The present invention provides a refrigerating machine oil comprising a lubricating base oil and an alkylated hydroxyanisole.

A content of the alkylated hydroxyanisole may be 0.1 to 10% by mass based on a total amount of the refrigerating machine oil.

The refrigerating machine oil may further comprise an acid scavenger.

The refrigerating machine oil may further comprise a hindered phenol compound having no methoxy group.

In the refrigerating machine oil, the lubricating base oil may comprise an oxygen-containing oil.

The refrigerating machine oil may be used with a refrigerant comprising a refrigerant having a GWP of 1000 or less.

The present invention also provides a working fluid composition for a refrigerating machine comprising the above-described refrigerating machine oil according to the present invention and a refrigerant.

Advantageous Effects of Invention

According to the present invention, it is possible to provide a refrigerating machine oil having excellent stability and a working fluid composition for a refrigerating machine containing the refrigerating machine oil.

DESCRIPTION OF EMBODIMENTS

Embodiments of the present invention will now be described in detail.

The refrigerating machine oil according to the present embodiment contains a lubricating base oil and an alkylated hydroxyanisole.

As the lubricating base oil, a hydrocarbon oil, an oxygen-containing oil, and the like can be used.

Examples of the hydrocarbon oil include mineral hydrocarbon oils and synthetic hydrocarbon oils.

The mineral hydrocarbon oil can be obtained by purifying a lubricating oil fraction obtained by atmospheric distillation and vacuum distillation of a paraffinic or naphthenic crude oil by a method such as solvent deasphalting, solvent refining, hydrorefining, hydrocracking, solvent dewaxing, hydrodewaxing, clay treatment, or sulfuric acid washing. One of these purification methods may be used alone, or two or more of them may be used in combination.

Examples of the synthetic hydrocarbon oil include an alkylbenzene, an alkylnaphthalene, a poly-α-olefin (PAO), a polybutene, and an ethylene-α-olefin copolymer.

The lubricating base oil preferably contain an oxygen-containing oil. Examples of the oxygen-containing oil include esters, ethers, carbonates, ketones, silicones, and polysiloxanes.

Examples of the ester include polyol esters, aromatic esters, dibasic acid esters, complex esters, carbonic acid esters, and mixtures thereof. Examples of the ether include polyvinyl ethers, polyalkylene glycols, polyphenyl ethers, perfluoroethers, and mixtures thereof. Among these, the polyol esters are preferably used as the oxygen-containing oil.

The polyol ester is an ester of a polyhydric alcohol and a fatty acid. As the fatty acid, a saturated fatty acid is preferably used. The number of carbon atoms of the fatty acid is preferably 4 to 20, more preferably 4 to 18, still more preferably 4 to 9, particularly preferably 5 to 9, and extremely preferably 8 to 9. The polyol ester may be a partial ester in which some of the hydroxyl groups of the polyhydric alcohol are not esterified and remain as hydroxyl groups, may be a complete ester in which all of the hydroxyl groups are esterified, or may be a mixture of the partial ester and the complete ester.

Among the fatty acids constituting the polyol ester, the proportion of the fatty acid having the above-described preferable number of carbon atoms is preferably 20 to 100% by mole, more preferably 50 to 100% by mole, still more preferably 60 to 100% by mole, particularly preferably 70 to 100% by mole, and extremely preferably 90 to 100% by mole. In particular, when a fatty acid having 9 carbon atoms is contained as the fatty acid constituting the polyol ester, the proportion of the fatty acid is preferably 40% by mole or more, more preferably 51% by mole or more, and even more preferably 60% by mole or more, and is preferably 100% by mole or less, more preferably 90% by mole or less, even more preferably 80% by mole or less, and particularly preferably 70% by mole or less.

In addition, among the fatty acids constituting the polyol ester, specific examples of the fatty acid having the above-described preferable number of carbon atoms (that is, a fatty acid having 4 to 20 carbon atoms) include a butanoic acid, a pentanoic acid, a hexanoic acid, a heptanoic acid, an octanoic acid, a nonanoic acid, a decanoic acid, an undecanoic acid, a dodecanoic acid, a tridecanoic acid, a tetradecanoic acid, a pentadecanoic acid, a hexadecanoic acid, a heptadecanoic acid, an octadecanoic acid, a nonadecanoic acid, and an icosanoic acid. These fatty acids may be linear or branched. The fatty acid is preferably a fatty acid having a branch at the α-position and/or the n-position, and more preferably a branched fatty acid having 4 to 9 carbon atoms, and specifically, is selected from 2-methylpropanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid and 2-ethylhexadecanoic acid, and is further preferably selected from 2-ethylhexanoic acid and 3,5,5-trimethylhexanoic acid from the viewpoint of compatibility with a refrigerant.

When the fatty acid constituting the polyol ester contains a branched fatty acid having 4 to 9 carbon atoms, the polyol ester preferably contains 40% by mole or more of 3,5,5-trimethylhexanoic acid from the viewpoint of exhibiting a good compatibility with a refrigerant and maintaining the kinematic viscosity and the refrigerant solution viscosity. On the other hand, when the amount of 3,5,5-trimethylhexanoic acid is too large, the polyol ester tends to be easily decomposed in the presence of a refrigerant. Therefore, the proportion of 3,5,5-trimethylhexanoic acid may be preferably 51% by mole or more, more preferably 60% by mole or more, and preferably 90% by mole or less, more preferably 80% by mole or less, particularly preferably 70% by mole or less.

The fatty acid may contain a fatty acid other than a fatty acid having 4 to 20 carbon atoms. The fatty acid other than the fatty acid having 4 to 20 carbon atoms may be, for example, a fatty acid having 21 to 24 carbon atoms. The fatty acid having 21 to 24 carbon atoms may be, for example, heneicosanoic acid, docosanoic acid, tricosanoic acid, or tetracosanoic acid, and may be linear or branched.

As the polyhydric alcohol constituting the polyol ester, a polyhydric alcohol having 2 to 6 hydroxyl groups is preferably used. The number of carbon atoms of the polyhydric alcohol is preferably 4 to 12, and more preferably 5 to 10. The polyhydric alcohol is preferably a hindered alcohol such as neopentyl glycol, trimethylolethane, trimethylolpropane, trimethylolbutane, di-(trimethylolpropane), tri-(trimethylolpropane), pentaerythritol, or dipentaerythritol, and more preferably pentaerythritol, dipentaerythritol, or a mixed alcohol of pentaerythritol and dipentaerythritol because of particularly excellent compatibility with a refrigerant and hydrolysis stability.

When the lubricating base oil contains the oxygen-containing oil, the content of the oxygen-containing oil in the lubricating base oil may be 50% by mass or more, 60% by mass or more, 70% by mass or more, 80% by mass or more, or 90% by mass or more, based on the total amount of the lubricating base oil, and may contain only the oxygen-containing oil.

The kinematic viscosity at 40° C. of the lubricating base oil may be preferably 3 mm²/s or more, more preferably 4 mm²/s or more, still more preferably 5 mm²/s or more, particularly preferably 10 mm²/s or more, extremely preferably 20 mm²/s or more, and very preferably 30 mm²/s or more. The kinematic viscosity at 40° C. of the lubricating base oil may be preferably 1000 mm²/s or less, more preferably 500 mm²/s or less, still more preferably 400 mm²/s or less, particularly preferably 300 mm²/s or less, extremely preferably 200 mm²/s or less, and very preferably 150 mm²/s or less. The kinematic viscosity at 100° C. of the lubricating base oil may be preferably 1 mm²/s or more, more preferably 2 mm²/s or more. The kinematic viscosity at 100° C. of the lubricating base oil may be preferably 100 mm²/s or less, more preferably 50 mm²/s or less, still more preferably 30 mm²/s or less, and particularly preferably 20 mm²/s or less. The kinematic viscosity in the present invention means a kinematic viscosity measured in accordance with JIS K2283:2000.

The refrigerating machine oil according to the present embodiment contains the alkylated hydroxyanisole. The alkylated hydroxyanisole is a compound having at least one hydroxyl group and at least one alkyl group in benzene ring of an anisole skeleton (a structure in which hydrogen of benzene is substituted with methoxy group). The number of carbon atoms of the alkyl group is, for example, 1 to 4. The alkyl group may be linear or branched, but is preferably branched, and is more preferably tert-butyl group. Examples of the alkylated hydroxyanisole include butylhydroxyanisole (BHA), and particularly include 2-alkyl-4-hydroxyanisole such as 2-tert-butyl-4-hydroxyanisole represented by the following formula (1), 3-alkyl-4-hydroxyanisole such as 3-tert-butyl-4-hydroxyanisole represented by the following formula (2), and a mixture thereof. The mixture preferably contains the compound represented by the following formula (1) and the compound represented by the following formula (2) in a mass ratio of 1:1.

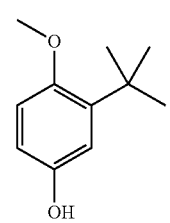

(1)

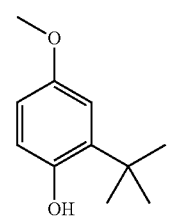

(2)

The content of the alkylated hydroxyanisole is preferably 0.1% by mass or more, more preferably 0.6% by mass or more, still more preferably 0.7% by mass or more, particularly preferably 0.8% by mass or more, and extremely preferably 0.9% by mass or more, and may be 1.0% by mass or more, 1.2% by mass or more, or 1.5% by mass or more, based on the total amount of the refrigerating machine oil. When the content of the alkylated hydroxyanisole is 0.1% by mass or more on the basis of the total amount of the refrigerating machine oil, it is possible to more appropriately suppress the generation of impurities caused by the refrigerant, which is described below, and to more effectively secure the stability of the refrigerating machine oil. The content of the alkylated hydroxyanisole is preferably 10% by mass or less, more preferably 5.0% by mass or less, still more preferably 4.0% by mass or less, particularly preferably 3.0% by mass or less, extremely preferably 2.9% by mass or less, and very preferably 2.8% by mass or less, based on the total amount of the refrigerating machine oil. When the content of the alkylated hydroxyanisole is 10% by mass or less based on the total amount of the refrigerating machine oil, an excessive decrease in the kinematic viscosity and the viscosity index of the refrigerating machine oil can be suppressed, and coloring at the time of aeration can be effectively suppressed.

The refrigerating machine oil according to the present embodiment may further contain an acid scavenger.

Examples of the acid scavenger include epoxy compounds (epoxy-based acid scavengers). Examples of the epoxy compound include glycidyl ether type epoxy compounds, glycidyl ester type epoxy compounds, aryloxirane compounds, alkyloxirane compounds, cycloaliphatic epoxy compounds, epoxidized fatty acid monoesters, and epoxidized vegetable oils. These acid scavengers can be used alone as one species or in combination of two or more species.

As the glycidyl ether type epoxy compound, for example, an aryl glycidyl ether type epoxy compound or an alkyl glycidylether type epoxy compound represented by the following formula (3) can be used.

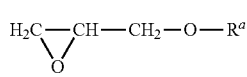

(3)

In the formula (3), $R^a$ represents an aryl group or an alkyl group having 5 to 18 carbon atoms.

The glycidyl ether type epoxy compound represented by the formula (3) is preferably phenyl glycidyl ether, n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decyl glycidyl ether, undecyl glycidyl ether, dodecyl glycidyl ether, tridecyl glycidyl ether, tetradecyl glycidyl ether, or 2-ethylhexyl glycidyl ether.

When the number of carbon atoms of the alkyl group represented by $R^a$ is 5 or more, the stability of the epoxy compound is ensured, and it is possible to suppress decomposition before reacting with moisture, a fatty acid, or an oxidation-degraded product, or to suppress self-polymerization, and thus it is easy to obtain functions of acid scavengers. On the other hand, when the alkyl group represented by $R^a$ has 18 or less carbon atoms, the compatibility with the refrigerant is favorably maintained, and the stability (suppression of precipitation of impurities) can be further improved.

As the glycidyl ether type epoxy compound, in addition to the epoxy compound represented by the formula (1), neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, polyalkylene glycol diglycidyl ether, and the like can also be used.

As the glycidyl ester type epoxy compound, for example, a compound represented by the following formula (4) can be used.

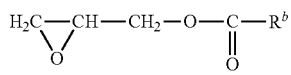

(4)

In the formula (4), $R^b$ represents an aryl group, an alkyl group having 5 to 18 carbon atoms, or an alkenyl group.

As the glycidyl ester type epoxy compound represented by the formula (4), glycidyl benzoate, glycidyl neodecanoate, glycidyl-2,2-dimethyloctanoate, glycidyl acrylate, and glycidyl methacrylate are preferable.

When the number of carbon atoms of the alkyl group represented by $R^b$ is 5 or more, the stability of the epoxy compound is ensured, and it is possible to suppress decomposition before reacting with moisture, a fatty acid, or an oxidation-degraded product, or to suppress self-polymerization in which epoxy compounds are polymerized with each other, and it is easy to obtain a target function. On the other hand, when the number of carbon atoms of the alkyl group or the alkenyl group represented by $R^b$ is 18 or less, the compatibility with the refrigerant is favorably maintained, and the stability (suppression of precipitation of impurities) can be further improved.

The cycloaliphatic epoxy compound is a compound having a partial structure represented by the following general formula (5) in which carbon atoms constituting an epoxy group directly constitutes a cycloaliphatic ring.

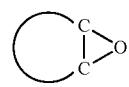

(5)

Preferred examples of the cycloaliphatic epoxy compound include 1,2-epoxycyclohexane, 1,2-epoxycyclopentane, 3',4'-epoxycyclohexylmethyl-3,4-epoxycyclohexanecarboxylate, bis(3,4-epoxycyclohexylmethyl) adipate, exo-2,3-epoxynorbornane, bis(3,4-epoxy-6-methylcyclohexylmethyl) adipate, 2-(7-oxabicyclo[4.1.0]hept-2-yl)-spiro (1,3-dioxane-5,3'-[7]oxabicyclo[4.1.0]heptane, 4-(1'-methylepoxyethyl)-1,2-epoxy-2-methylcyclohexane, and 4-epoxyethyl-1,2-epoxycyclohexane.

Examples of the aryloxirane compound include 1,2-epoxystyrene and alkyl-1,2-epoxystyrene.

Examples of the alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane, and 1,2-epoxyicosane.

Examples of the epoxidized fatty acid monoester include esters of an epoxidized fatty acid having 12 to 20 carbon atoms and an alcohol, phenol or alkylphenol having 1 to 8 carbon atoms. As the epoxidized fatty acid monoester, butyl, hexyl, benzyl, cyclohexyl, methoxyethyl, octyl, phenyl and butylphenyl esters of epoxystearic acid are preferably used.

Examples of epoxidized vegetable oils include epoxy compounds of vegetable oils such as soybean oil, linseed oil and cottonseed oil.

The acid scavenger is preferably at least one selected from glycidyl ester type epoxy compounds and glycidyl ether type epoxy compounds, and is preferably at least one selected from glycidyl ester type epoxy compounds from the viewpoint of excellent compatibility with resin materials used for members in a refrigerating machine.

The content of the acid scavenger is preferably 0.1% by mass or more, more preferably 0.2% by mass or more, and even more preferably 0.4% by mass or more, based on the total amount of the refrigerating machine oil. The content of the acid scavenger is preferably 4% by mass or less, more preferably 2% by mass or less, even more preferably 1.5% by mass or less, and particularly preferably 1.2% by mass or less, based on the total amount of the refrigerating machine oil.

When the refrigerating machine oil according to the present embodiment contains the acid scavenger, the mass ratio of the content of the acid scavenger to the total content of the alkylated hydroxyanisole and the acid scavenger (content of acid scavenger/total content of alkylated hydroxyanisole and acid scavenger) in the refrigerating machine oil is preferably 0.1 or more, more preferably 0.3 or more, even more preferably 0.5 or more, and preferably 1.0 or less, more preferably 0.9 or less, even more preferably 0.8 or less.

When the refrigerating machine oil according to the present embodiment contains the acid scavenger, the total content of the alkylated hydroxyanisole and the acid scavenger in the refrigerating machine oil is preferably 0.7% by mass or more, more preferably 1.0% by mass or more, still more preferably 1.5% by mass or more, particularly preferably 2% by mass or more, and preferably 10% by mass or less, more preferably 6% by mass or less, still more preferably 5% by mass or less, particularly preferably 4% by mass or less, extremely preferably 3% by mass or less, based on the total amount of the refrigerating machine oil.

From the viewpoint of more effectively exhibiting the effects of the present invention, the refrigerating machine oil according to the present embodiment preferably further contains a hindered phenol compound having no methoxy group. The hindered phenol compound having no methoxy group refers to a compound in which hydrogen of a benzene ring in the hindered phenol compound is not substituted with a methoxy group. Examples of the hindered phenol compound having no methoxy group include 2,6-di-tert-butyl-p-cresol (DBPC), 2,6-di-tert-butyl-phenol, 4,4'-methylen-ebis(2,6-di-tert-butyl-phenol), and a group of compounds having a structure similar thereto, and DBPC is preferably used. When the refrigerating machine oil contains the hindered phenol compound having no methoxy group, the content thereof is preferably 0.1% by mass or more, more preferably 0.6% by mass or more, still more preferably 0.7% by mass or more, particularly preferably 0.8% by mass or more, and extremely preferably 0.9% by mass or more, and is preferably 10% by mass or less, more preferably 5.0% by mass or less, still more preferably 4.0% by mass or less, particularly preferably 3.0% by mass or less, extremely preferably 2.9% by mass or less, and very preferably 2.8% by mass or less, based on the total amount of the refrigerating machine oil.

The refrigerating machine oil according to the present embodiment may further contain other additives. Examples of other additives include antioxidants such as amine-based antioxidants, extreme pressure agents, oiliness agents, antifoaming agents, metal deactivators, antiwear agents, viscosity index improvers, pour point depressants, and detergent dispersants. When these additives are contained, the content thereof may be 10% by mass or less or 5% by mass or less based on the total amount of the refrigerating machine oil, unless otherwise specified below.

Examples of the amine-based antioxidant include phenyl-α-naphthylamines and dialkylated diphenylamines. When the refrigerating machine oil according to the present embodiment contains the antioxidant such as the amine-based antioxidant, the content thereof is preferably 0.1% by mass or more, more preferably 0.6% by mass or more, still more preferably 0.7% by mass or more, particularly preferably 0.8% by mass or more, and extremely preferably 0.9% by mass or more, and is preferably 10% by mass or less, more preferably 5.0% by mass or less, still more preferably 4.0% by mass or less, particularly preferably 3.0% by mass or less, extremely preferably 2.9% by mass or less, and very preferably 2.8% by mass or less, based on the total amount of the refrigerating machine oil.

The kinematic viscosity at 40° C. of the refrigerating machine oil may be preferably 3 $mm^2/s$ or more, more preferably 4 $mm^2/s$ or more, still more preferably 5 $mm^2/s$ or more, particularly preferably 10 $mm^2/s$ or more, extremely preferably 20 $mm^2/s$ or more, very preferably 30 $mm^2/s$ or more, from the viewpoint of securing lubricity. The kinematic viscosity at 40° C. of the refrigerating machine oil may be preferably 500 $mm^2/s$ or less, more preferably 400 $mm^2/s$ or less, still more preferably 300 $mm^2/s$ or less, particularly preferably 200 $mm^2/s$ or less, extremely preferably 150 $mm^2/s$ or less, from the viewpoint of suppressing viscous resistance in the compressor. The kinematic viscosity at 100° C. of the refrigerating machine oil may be preferably 1 $mm^2/s$ or more, more preferably 2 $mm^2/s$ or more, from the viewpoint of securing lubricity. The kinematic viscosity at 100° C. of the refrigerating machine oil may be preferably 100 $mm^2/s$ or less, more preferably 50 $mm^2/s$ or less, from the viewpoint of suppressing viscous resistance in the compressor.

The pour point of the refrigerating machine oil may preferably be −10° C. or less, more preferably −20° C. or less. The pour point in the present invention means a pour point measured in accordance with JIS K2269:1987.

The volume resistivity of the refrigerating machine oil may be preferably $1.0 \times 10^9$ Ω·m or more, more preferably $1.0 \times 10^{10}$ Ω·m or more, and still more preferably $1.0 \times 10^{11}$ Ω·m or more. The volume resistivity in the present invention means a volume resistivity at 25° C. measured in accordance with JIS C2101:1999.

The moisture content of the refrigerating machine oil may be preferably 200 ppm or less, more preferably 100 ppm or less, and even more preferably 50 ppm or less, based on the total amount of the refrigerating machine oil. The moisture content in the present invention means a moisture content measured in accordance with JIS K2275 (Karl Fischer titration method).

The acid value of the refrigerating machine oil may be preferably 1.0 mgKOH/g or less, more preferably 0.1 mgKOH/g or less, and still more preferably 0.05 mgKOH/g or less. When the acid value of the refrigerating machine oil is 1.0 mgKOH/g or less, chemical stability can be more reliably ensured. The acid value in the present invention means an acid value measured in accordance with JIS K2501:2003.

The ash content of the refrigerating machine oil may preferably be 100 ppm or less, more preferably 50 ppm or less. The ash content in the present invention means an ash content measured in accordance with JIS K2272:1998.

The refrigerating machine oil according to this embodiment is usually present in a refrigerating machine and mixed with a refrigerant as a working fluid composition for a refrigerating machine. That is, the refrigerating machine oil according to the present embodiment is used with the refrigerant containing trifluoroiodomethane, and the working fluid composition for a refrigerating machine according to the present embodiment contains the refrigerating machine oil according to the present embodiment and a refrigerant. The content of the refrigerating machine oil in the working fluid composition for a refrigerating machine may be 1 to 500 parts by mass, or 2 to 400 parts by mass, with respect to 100 parts by mass of the refrigerant.

As the refrigerant, a refrigerant having a low global warming potential (GWP) is preferably used in order to reduce the influence on the global environment. Specifically, the refrigerant may have a GWP of 1000 or less, 500 or less, 100 or less, 50 or less, or 10 or less. When a refrigerant having a GWP of 1000 or less is used as the refrigerant, the refrigerant may contain only a refrigerant having a GWP of 1000 or less, or may be a mixed refrigerant of a refrigerant having a GWP of 1000 or less and a refrigerant other than the refrigerant having a GWP of 1000 or less. The content of the refrigerant having a GWP of 1000 or less is preferably 10% by mass or more, more preferably 20% by mass or more, and still more preferably 30% by mass or more, based on the total amount of the refrigerant. The content of the refrigerant having a GWP of 1000 or less is preferably 100% by mass or less, more preferably 50% by mass or less, and still more preferably 40% by mass or less, based on the total amount of the refrigerant.

As the refrigerant having a GWP of 1000 or less, for example, trifluoroiodomethane may be used. When the refrigerant contains trifluoroiodomethane, the refrigerant may contain only trifluoroiodomethane or may further contain a refrigerant other than trifluoroiodomethane. The content of trifluoroiodomethane is preferably 10% by mass or more, more preferably 20% by mass or more, still more preferably 30% by mass or more, based on the total amount of the refrigerant. The content of trifluoroiodomethane is preferably 100% by mass or less, more preferably 50% by mass or less, still more preferably 40% by mass or less, based on the total amount of the refrigerant.

Examples of the refrigerant other than trifluoroiodomethane include a saturated hydrofluorocarbon refrigerant, an unsaturated hydrofluorocarbon refrigerant, a hydrocarbon refrigerant, a fluorine-containing ether refrigerant such as perfluoroethers, a bis(trifluoromethyl)sulfide refrigerant, a natural refrigerant such as ammonia and carbon dioxide, and a mixed refrigerant of two or more selected from these refrigerants.

Examples of the saturated hydrofluorocarbon refrigerant include a saturated hydrofluorocarbon having preferably 1 to 3 carbon atoms, more preferably 1 to 2 carbon atoms. Specific examples include difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or a mixture of two or more thereof.

The saturated hydrofluorocarbon refrigerant is appropriately selected from the above depending on the application and the required performance. Preferable examples include R32 alone; R23 alone; R134a alone; R125 alone; a mixture of R134a/R32 of 60 to 80% by mass/40 to 20% by mass; a mixture of R32/R125 of 40 to 70% by mass/60 to 30% by mass; a mixture of R125/R143a of 40 to 60% by mass/60 to 40% by mass; a mixture of R134a/R32/R125 of 60% by mass/30% by mass/10% by mass; a mixture of R134a/R32/R125 of 40 to 70% by mass/15 to 35% by mass/5 to 40% by mass; and a mixture of R125/R134a/R143a of 35 to 55% by mass/1 to 15% by mass/40 to 60% by mass. More specifically, a mixture of R134a/R32 of 70/30% by mass; a mixture of R32/R125 of 60/40% by mass; a mixture of R32/R125 of 50/50% by mass (R410A); a mixture of R32/R125 of 45/55% by mass (R410B); a mixture of R125/R143a of 50/50% by mass (R507C); a mixture of R32/R125/R134a of 30/10/60% by mass; a mixture of R32/R125/R134a of 23/25/52% by mass (R407C); a mixture of R32/R125/R134a of 25/15/60% by mass (R407E); and a mixture of R125/R134a/R143a of 44/4/52% by mass (R404A).

Preferable examples of the mixed refrigerant of trifluoroiodomethane and the saturated hydrofluorocarbon refrigerant include an R32/R125/trifluoroiodomethane mixed refrigerant and an R32/R410A/trifluoroiodomethane mixed refrigerant. The ratio of R32:trifluoroiodomethane in such a mixed refrigerant is preferably 2 to 90:90 to 10, more preferably 10 to 70:70 to 30, still more preferably 30 to 60:60 to 40, and particularly preferably 40 to 60:50 to 40, from the viewpoint of compatibility with refrigerating machine oil, low GWP, and incombustibility. Similarly, the ratio of the mixed refrigerant of R32 and trifluoroiodomethane:R125 is preferably 10 to 95:90 to 5, more preferably 50 to 95:50 to 5, and still more preferably 80 to 95:20 to 5.

The unsaturated hydrofluorocarbon (HFO) refrigerant is preferably a fluoropropene, more preferably a fluoropropene having 3 to 5 fluorine atoms. Specifically, any one of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf), or a mixture of two or more thereof are preferable. One or two or more selected from HFO-1225ye, HFO-1234ze and HFO-1234yf are preferable from the viewpoint of the physical properties of the refrigerant.

The hydrocarbon refrigerant is preferably a hydrocarbon having 1 to 5 carbon atoms, more preferably a hydrocarbon having 2 to 4 carbon atoms. Specific examples of the hydrocarbon include methane, ethylene, ethane, propylene, propane (R290), cyclopropane, normal butane, isobutane, cyclobutane, methylcyclopropane, 2-methylbutane, normal pentane, and a mixture of two or more thereof. Among them, those which are gaseous at 25° C. and 1 atm are preferably used, and propane, normal butane, isobutane, 2-methylbutane or a mixture thereof is preferably used.

The refrigerating machine oil and the working fluid composition for a refrigerating machine according to the present embodiment are suitably used for an air conditioner having a reciprocating or rotary hermetic compressor, a refrigerator, an open or hermetic car air conditioner, a dehumidifier, a water heater, a freezer, a freezing and refrigerating warehouse, an automatic vending machine, a showcase, a refrigerating machine such as a chemical plant, and a refrigerating machine having a centrifugal compressor.

Examples

Hereinafter, the present invention will be described more specifically based on Examples, but the present invention is not limited to the following Examples.

In the Examples and Comparative Examples, a refrigerating machine oil having the composition (% by mass based on the total amount of the refrigerating machine oil) shown in Table 1 was prepared using a base oil and additives shown below. The kinematic viscosity at 40° C. of these refrigerating machine oils was about in the range of 70 to 75 mm²/s.
(Base Oil)
A1: polyol ester of pentaerythritol and mixed fatty acid of 2-ethylhexanoic acid/3,5,5-trimethylhexanoic acid (molar ratio: 37/63) (kinematic viscosity at 40° C.: 75.5 mm$^2$/s, kinematic viscosity at 100° C.: 8.9 mm$^2$/s)

(Additive)
  B1: butylhydroxyanisole (a mixture of the compound represented by the formula (1) and the compound represented by the formula (2))
  B2: butylhydroxyanisole (only the compound represented by the formula
  (1) Obtained by Preparative LC)
  B3: butylhydroxyanisole (only the compound represented by the formula
  (2) Obtained by Preparative LC)
  C1: glycidyl neodecanoate (epoxy-based acid scavenger)
  D1: 2,6-di-tert-butyl-p-cresol
  D2: dialkylated diphenylamine (amine-based antioxidants)

As a refrigerant containing trifluoroiodoethane, difluoromethane (R32), a mixture of difluoromethane (R32)/pentafluoroethane of 50/50% by mass (R410A), and trifluoroiodomethane were mixed to prepare a mixed refrigerant containing R32, R125 and trifluoroiodomethane (mixing ratio (mass ratio):R32/R410A/trifluoroiodomethane=37.5/23/39.5, i.e., R32/R125/trifluoroiodomethane=49.0/11.5/39.5). The mixed refrigerant having this composition has a GWP of 733 and is considered to be a nonflammable refrigerant (A1) in the category of the ASHRAE.

Each of the refrigerating machine oils of Examples 1 to 4 and Comparative Example 1 was subjected to the following evaluation test.

In an autoclave, 30 g of the refrigerating machine oil prepared to have a moisture content of 10 ppm or less (initial color: L0.5, initial acid value: 0.01 mgKOH/g or less), 30 g of the mixed refrigerant prepared above, and a 0.6 mm φ×50 mm catalyst (one each of copper, iron, and aluminum) were placed in a 200 ml autoclave, heated to 175° C., and held for 48 hours. After 48 hours, the content of impurities, the color (ASTM D152) and the acid value of the refrigerating machine oil were measured. The results are shown in Table 1.

The invention claimed is:

1. A refrigerating machine oil comprising:
  a lubricating base oil;
  an alkylated hydroxyanisole comprising a butylhydroxyanisole;
  2,6-di-tert-butyl-p-cresol; and
  an epoxy-based acid scavenger selected from the group consisting of a glycidyl ether type epoxy compound and a glycidyl ester type epoxy compound,
  and the refrigerating machine oil being used with a refrigerant,
wherein the lubricating base oil consists of at least one selected from the group consisting of
  an oxygen-containing oil,
wherein the oxygen-containing oil consists of a polyol ester of
  a polyhydric alcohol comprising pentaerythritol and
  a fatty acid having 4 to 9 carbon atoms,
  and
wherein a content of the alkylated hydroxyanisole is 0.6% by mass or more and 3.0% by mass or less, a content of the 2,6-di-tert-butyl-p-cresol is 0.1% by mass or more and 3.0% by mass or less, and a content of the epoxy-based acid scavenger is 0.1% by mass or more and 4% by mass or less, based on a total amount of the refrigerating machine oil.

2. The refrigerating machine oil according to claim 1, wherein the refrigerant has a GWP of 1000 or less.

3. A working fluid composition for a refrigerating machine, comprising:
  a refrigerant; and
  a refrigerating machine oil comprising
    a lubricating base oil,
    an alkylated hydroxyanisole comprising a butylhydroxyanisole, and
    2,6-di-tert-butyl-p-cresol, and
  an epoxy-based acid scavenger selected from the group consisting of a glycidyl ether type epoxy compound and a glycidyl ester type epoxy compound,

TABLE 1

| | | Example 1 | Example 2 | Example 3 | Example 4 | Example 5 | Example 6 | Comparative Example 1 |
|---|---|---|---|---|---|---|---|---|
| Composition (% by mass) | A1 | Remainder | Remainder | Remainder | Remainder | Remainder | Remainder | Remainder |
| | B1 | 0.9 | 2.7 | 0.9 | 0.9 | — | — | — |
| | B2 | — | — | — | — | 0.9 | — | — |
| | B3 | — | — | — | — | — | 0.9 | — |
| | C1 | 0.7 | 0.7 | 0.7 | 0.7 | 0.7 | 0.7 | 0.7 |
| | D1 | — | — | 0.9 | 0.9 | — | — | — |
| | D2 | — | — | 0.9 | — | — | — | 2.7 |
| Impurities | mg/100 g OIL | 0 | 0 | 0 | 0 | 0 | 0 | 20.1 |
| Color | ASTM D156 | L0.5 | L0.5 | L2.0 | L0.5 | L0.5 | L0.5 | D8.0 |
| Acid value | mgKOH/g | 0.02 | 0.02 | 0.03 | 0.01 | 0.02 | 0.02 | 0.73 |

The refrigerating machine oils of Example 1 and Example 4 were subject to the same procedure as above except that the holding time in the autoclave was changed to 72 hours to measure the acid value of the refrigerating machine oils after 72 hours. The acid value of the refrigerating machine oil of Example 1 was 0.55 mgKOH/g, and the acid value of the refrigerating machine oil of Example 4 was 0.05 mgKOH/g. When the refrigerating machine oil further containing a hindered phenol compound having no methoxy group as well as the alkylated hydroxyanisole, the effect of suppressing the acid value could be further improved.

wherein the lubricating base oil consists of at least one selected from the group consisting of
  an oxygen-containing oil,
wherein the oxygen-containing oil consists of a polyol ester of
  a polyhydric alcohol comprising pentaerythritol and
  a fatty acid having 4 to 9 carbon atoms, and
wherein a content of the alkylated hydroxyanisole is 0.6% by mass or more and 3.0% by mass or less, a content of the 2,6-di-tert-butyl-p-cresol is 0.1% by mass or more and 3.0% by mass or less, and a content of the epoxy-based acid scavenger is 0.1% by mass or more and 4% by mass or less, based on a total amount of the refrigerating machine oil.

4. The working fluid composition for a refrigerating machine according to claim 3, wherein the refrigerant has a GWP of 1000 or less.

5. The refrigerating machine oil according to claim 1, wherein a mass ratio of the content of the epoxy-based acid scavenger to the total content of the alkylated hydroxyanisole and the acid scavenger is 0.1 or more and 1.0 or less.

6. The refrigerating machine oil according to claim 1, wherein the total content of the alkylated hydroxyanisole and the acid scavenger is 1.0% by mass or more based on the total amount of the refrigerating machine oil.

* * * * *